United States Patent
Li et al.

(10) Patent No.: US 10,129,701 B2
(45) Date of Patent: Nov. 13, 2018

(54) LOCATION CONTEXT MANAGING METHOD AND ELECTRONIC DEVICE

(71) Applicant: MEDIATEK INC., Hsin-Chu (TW)

(72) Inventors: Chin-Lung Li, Taoyuan (TW); Chin-Tang Weng, Hsinchu County (TW); Feng-Jian Chou, Chiayi County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/145,815

(22) Filed: May 4, 2016

(65) Prior Publication Data

US 2017/0078849 A1    Mar. 16, 2017

Related U.S. Application Data

(60) Provisional application No. 62/218,581, filed on Sep. 15, 2015.

(51) Int. Cl.
| | |
|---|---|
| *H04W 24/00* | (2009.01) |
| *H04W 4/02* | (2018.01) |
| *G01S 5/02* | (2010.01) |
| *H04W 4/80* | (2018.01) |

(52) U.S. Cl.
CPC .......... *H04W 4/025* (2013.01); *G01S 5/0263* (2013.01); *H04W 4/80* (2018.02)

(58) Field of Classification Search
CPC .... H04W 4/025; H04W 4/008; H04W 64/006
USPC ............. 455/456.1, 404.2, 414.1, 421, 432.1
See application file for complete search history.

(56) References Cited

U.S. PATENT DOCUMENTS

| | | | | |
|---|---|---|---|---|
| 7,353,033 | B2* | 4/2008 | Kwon | H04W 4/02 379/88.14 |
| 8,498,811 | B2 | 7/2013 | Lundquist | |
| 2002/0193940 | A1 | 12/2002 | Hashida | |
| 2012/0232792 | A1* | 9/2012 | Ding | G01C 21/165 701/472 |
| 2015/0127259 | A1 | 5/2015 | Kazemipur | |
| 2015/0249904 | A1* | 9/2015 | Weiss | H04W 4/023 455/456.1 |
| 2016/0226696 | A1* | 8/2016 | Zhang | H04L 27/2663 |
| 2017/0061528 | A1* | 3/2017 | Arora | G06Q 30/08 |

FOREIGN PATENT DOCUMENTS

| | | |
|---|---|---|
| CN | 103810898 A | 5/2014 |
| CN | 103942973 A | 7/2014 |
| CN | 103956071 B | 9/2015 |

* cited by examiner

*Primary Examiner* — Nghi H Ly
(74) *Attorney, Agent, or Firm* — Wolf, Greenfield & Sacks, P.C.

(57) ABSTRACT

A location context managing method applied to an electronic device having at least one sensor, including: receiving positioning information from a plurality of positioning sources; receiving a value from the sensor; choosing a scenario from a scenario table based on the value received from the sensor and the positioning information received from the plurality of positioning sources, and calculating a location of the electronic device according to the scenario, wherein the scenario table lists a plurality of scenarios, each decides which positioning information from the plurality positioning sources to be adopted for the location calculation.

20 Claims, 4 Drawing Sheets

LOCATION CONTEXT MANAGING METHOD AND ELECTRONIC DEVICE

CROSS REFERENCE TO RELATED APPLICATIONS

This application claims the benefit of U.S. provisional application No. 62/218,581, filed on Sep. 15, 2015 and incorporated herein by reference.

BACKGROUND

The present invention relates to a positioning method, and more particularly, to a context managing method and an electronic device.

Traditionally, an electronic device such as a smart phone utilizes radio signals (e.g. Global Positioning System (GPS), Wireless Fidelity (WiFi), or a Bluetooth (BT)) for positioning. However, if only one single positioning method is applied for positioning, the current absolute position and continuous track data will no longer be recorded when the radio signals strength are not good enough. For example, when the user is driving/walking in an underground parking lot, the radio signals may be very weak or may be lost. In addition, constantly searching for radio signals (e.g. GPS signal or WiFi signal) for positioning causes considerable power consumption.

Therefore, a method capable of detecting the context of the user to selectively turn off the positioning source to save power and/or capable of utilizing multiple positioning sources at the same time for positioning is desirable.

SUMMARY

One of the objectives of the present invention is to provide a location context managing method to detect a context of a user for positioning and an electronic device.

According to an embodiment of the present invention, a location context managing method applied to an electronic device having at least one sensor is disclosed, wherein the method comprises: receiving positioning information from a plurality of positioning sources; receiving a value from the sensor; choosing a scenario from a scenario table based on the value received from the sensor and the positioning information received from the plurality of positioning sources, and calculating a location of the electronic device according to the scenario, wherein the scenario table lists a plurality of scenarios, each decides which positioning information from the plurality positioning sources to be adopted for the location calculation.

According to an embodiment of the present invention, an electronic device having at least one sensor is disclosed, wherein the electronic device comprises: a storage device, arranged to store a program code; and a processor, arranged to execute the program code. When loaded and executed by the processor, the program code instructs the processor to execute following steps: receiving positioning information from a plurality of positioning sources; receiving a value from the sensor; choosing a scenario from a scenario table based on the value received from the sensor and the positioning information received from the plurality of positioning sources, and calculating a location of the electronic device according to the scenario, wherein the scenario table lists a plurality of scenarios, each decides which positioning information from the plurality positioning sources to be adopted for the location calculation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
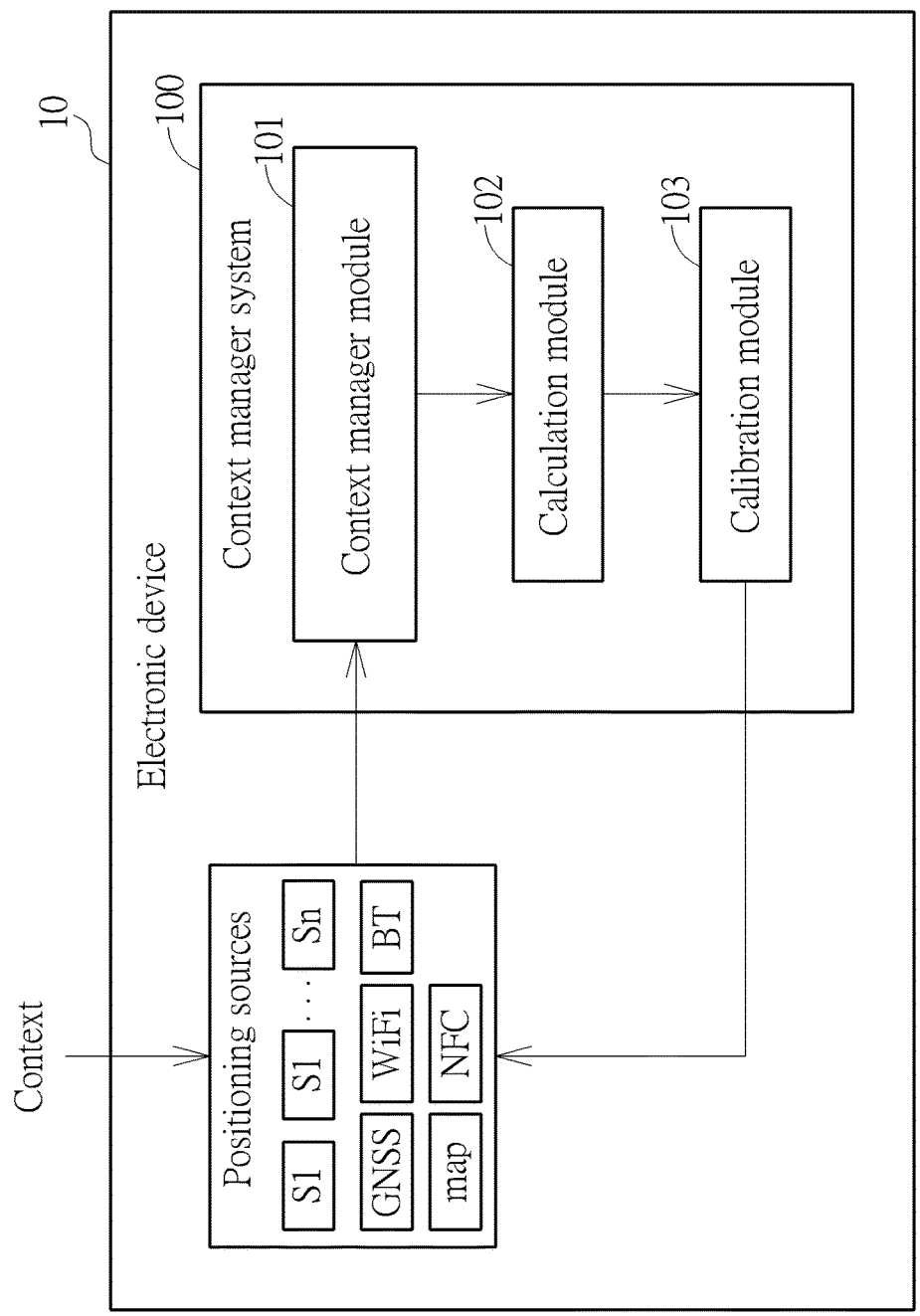
FIG. 1 is a diagram illustrating a location context managing system applied to an electronic device according to an embodiment of the present invention.

FIG. 1 is a diagram illustrating a location context managing system 100 applied to an electronic device 10 according to an embodiment of the present invention. The electronic device 10 is equipped with positioning capability. For example, the electronic device 10 may be a portable navigation device such as a mobile phone or a tablet. For another example, the electronic device 10 may be a part of a car navigation system. As shown in FIG. 1, the electronic device 10 includes a location context managing system 100 and a plurality of positioning sources, wherein the context manager system 100 includes a context managing module 101, a calculation module 102 and a calibration module 103, and the plurality of positioning sources include a Global Navigation Satellite System (GNSS) receiver (e.g., a Global Positioning System (GPS) receiver), a Wireless Fidelity (Wi-Fi) device, a Near-Field Communication (NFC) device, a Bluetooth (BT) device, a map and a plurality of sensors S1 to Sn. The plurality of sensors S1 to Sn include, not a limitation, an accelerometer, a magnetic sensor, a gyroscope, a pressure sensor, etc. It should be noted that the plurality of sensors S1 to Sn can be the sensors installed in the electronic device 10 or the ones connected to the electronic device 10 in a wired manner or a wireless manner. For example, the plurality of sensors S1 to Sn may include an odometer sensor connected to the electronic device 10 wirelessly or by-wired, and arranged to measure the moving distance or the orientation of the car. Those skilled in the art should understand the functions of the plurality of positioning sources, the detailed description of the plurality of positioning sources is thus omitted here due to the highlight of the present invention should focus on the positioning method.

The location context managing module 101, calculation module 102 and calibration module 103 of the location context managing system 100 may be software modules. The context managing module 101 is arranged to receive positioning information of the plurality of positioning sources and selectively turnoff the positioning sources, wherein the positioning information of the plurality of positioning sources are varied according to the context of the user of the electronic device 10. For example, the positioning information of the GNSS receiver is referred to the signal strength received by the GNSS receiver. If the user of the electronic device 10 drives a car into an underground parking lot from outdoor, the strength of the satellite signal received by the GNSS receiver becomes weaker. When the strength of the satellite signal received by the GNSS receivers is smaller than a predetermined value, the location context managing module 101 can turn off the GNSS receiver to save power. In this way, the context managing module 101 prevents the GNSS receiver from keeping searching for the satellite signal even when the strength of the satellite signal is way too small. For another example, the positioning information of the pressure sensor is referred to the pressure measured by the pressure sensor. If the user takes an elevator from the underground parking lot to high floor office, the pressure measured by the pressure sensor becomes smaller. For yet another example, the state of the map is referred to the accuracy.

The calculation module 102 is arranged to calculate a location of the electronic device 10 according to the positioning information of the plurality of positioning sources which varied with the scenarios. Because the location is calculated based on multiple positioning sources, the accuracy can be greatly improved. The calibration module 103 is arranged to calibrate the plurality of positioning sources according to the location calculated by the calculation module 102. It should be noted that the calibration module 103 may be optional depending upon actual design considerations.

Figure 2:
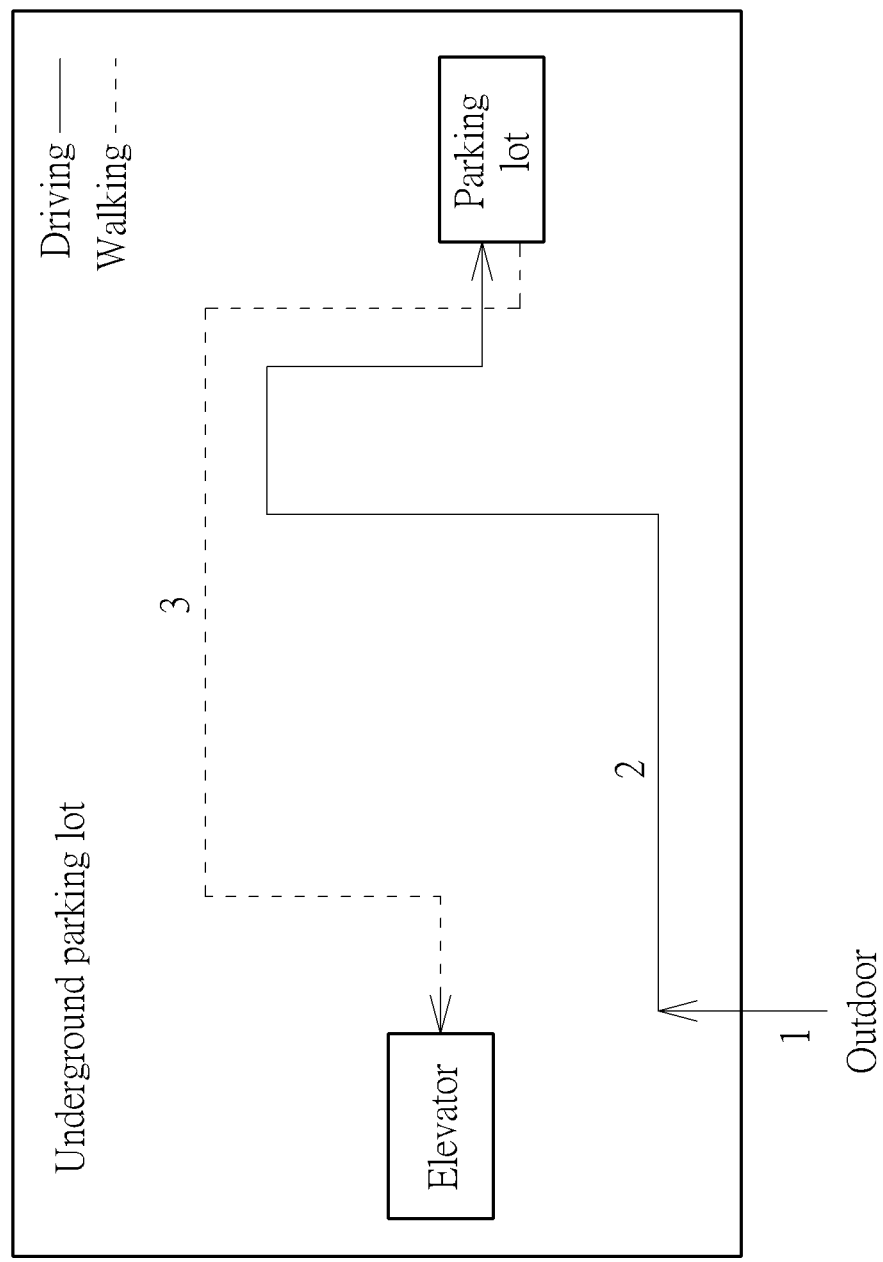
FIG. 2 is a diagram illustrating a route according to an embodiment of the present invention.

FIG. 2 is a diagram illustrating a route according to an embodiment of the present invention. As shown in FIG. 2, it is assumed that the user is driving outdoor at the first place. At this moment, the position of the user can be located by the GNSS signal. Also, because of driving outdoor, the strength of the Wi-Fi signal is smaller than the predetermined value, the context managing module 101 turns off the Wi-Fi device for saving power. Next, following the route 1 shown in FIG. 2, the user drives into an underground parking lot from outdoor. The context managing module 101 checks the positioning information of the GNSS receiver and finds out the strength of the signal received by the GNSS receiver is smaller than the predetermined value, the context manager module 101 thus turns off the GNSS receiver. Next, following the route 2 shown in FIG. 2, the user drives in the underground parking lot. At this moment, the calculation module 102 calculates the track of the user by automobile dead-reckoning method according to one or more of the plurality of sensors S1 to Sn. Then, following the route 3 shown in FIG. 2, the user walks in the underground parking lot. At this moment, the calculation module 102 calculates the track of the user by pedestrian dead-reckoning method according to one or more of the plurality of sensors S1 to Sn. Then, the user enters the elevator. At this moment, the calculation module 102 calculates the track of the user according to one or more of the plurality of sensors S1 to Sn and also utilizes the map to accurately position the user. Finally, the user walks out the elevator and enters the office. At this moment, the calculation module 101 calculates the track of the user according to the signal received by the Wi-Fi device. When the user needs to find the car parked in the underground parking lot, the electronic device 10 can retrace the track to inform the user of the parking position of the car.

Table 1 shown below illustrates scores of the positioning sources in different contexts according to an embodiment of the present invention. The scores shown in the table 1 represent the dependency of the positioning information of the plurality of sources in the specific context. For example, when the user drives outdoor, the GNSS signal scores 2 points due to the strongest dependency. In addition, the Wi-Fi device is unable to receive any Wi-Fi signal when the user drives outdoor, the Wi-fi device thus scores 0 points. At this case, the context manager module 101 turns off the Wi-Fi device to save more power. It should be noted that Table 1 is only for illustrative purpose, and the score of the positioning source only represents the dependency of the positioning source to indicate how important the positioning source is in the specific context for positioning, not an actual score.

TABLE 1

| | context | | | | |
|---|---|---|---|---|---|
| Source | Driving outdoor | Underground driving | Underground walking | elevator | Office walking |
| GNSS | 2 | 0 | 0 | 0 | 0 |
| Sensor | 1 | 1 | 2 | 1 | 1 |
| WiFi | 0 | 1 | 0 | 0 | 2 |
| Map | 0 | 1 | 1 | 2 | 0 |

In different contexts, the context manager module 101 can still utilize multiple positioning sources for positioning, such that the accuracy can be greatly improved. Also, by turning off the positioning source which has the poorest dependency for positioning, the power consumption can be reduced.

Figure 3:
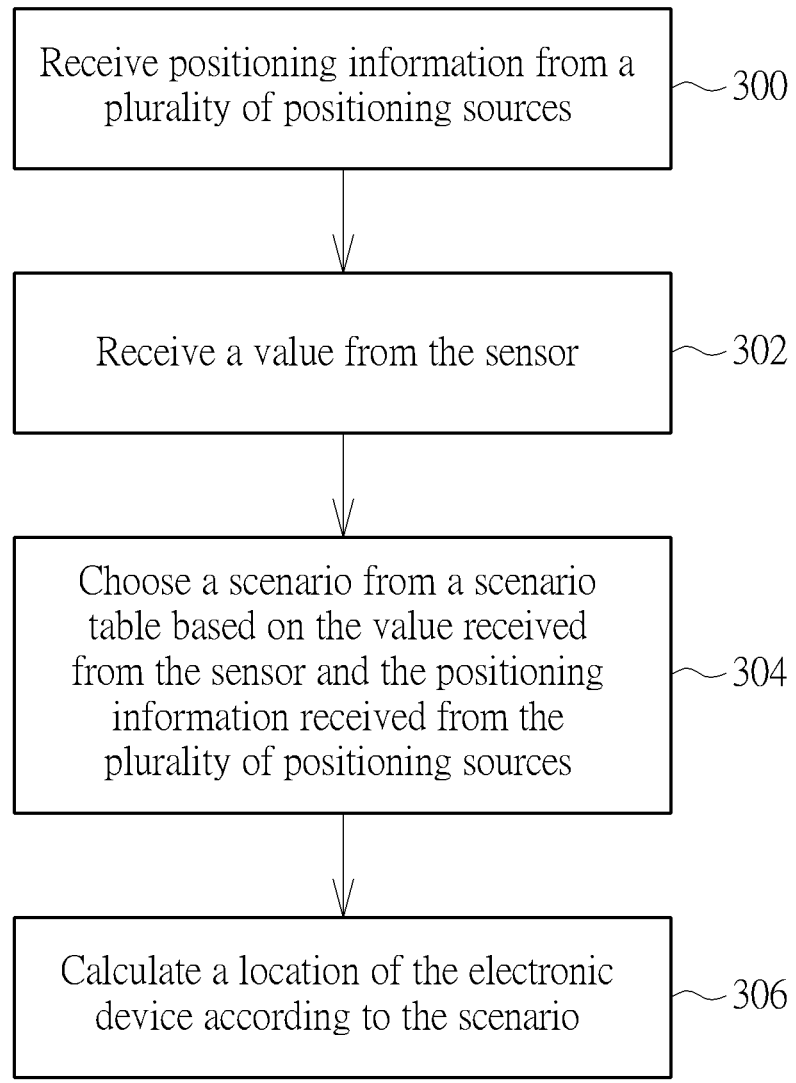
FIG. 3 is a flowchart illustrating the operation of a context managing system in different contexts according to an embodiment of the present invention.

FIG. 3 is a flowchart illustrating the operation of the context manager system according to an embodiment of the present invention. Provided that the result is substantially the same, the steps are not required to be executed in the exact order shown in FIG. 3, the operation may be briefly summarized by following steps.

Step 300: receive positioning information from a plurality of positioning sources.

Step 302: receive a value from the sensor.

Step 304: choose a scenario from a scenario table based on the value received from the sensor and the positioning information received from the plurality of positioning sources.

Step 306: calculate a location of the electronic device according to the scenario.

As a person skilled in the art can readily understand details of each step shown in FIG. 3 after reading above paragraphs directed to the context manager system 100 shown in FIG. 1, further description is omitted here for brevity.

Figure 4:
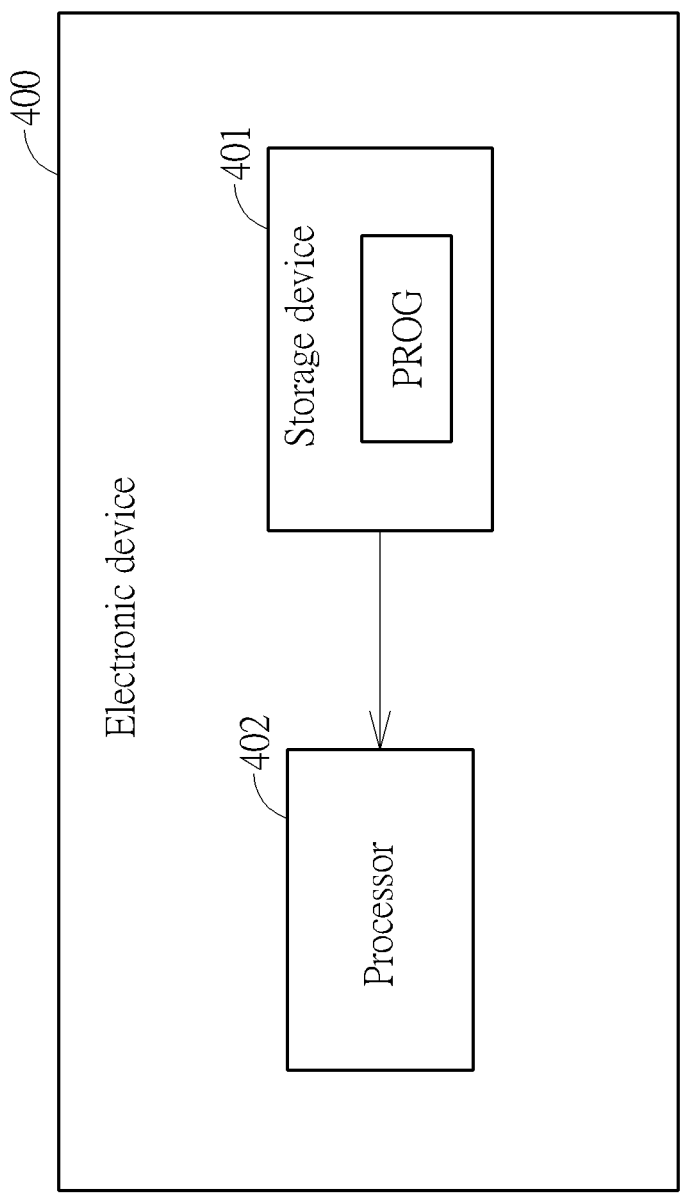
FIG. 4 is a diagram illustrating an electronic device according to an embodiment of the present invention.

FIG. 4 is a diagram illustrating an electronic device 400 according to an embodiment of the present invention. The location context managing system. 100≅can be implemented using the electronic device 400. As shown in FIG. 4, the electronic device 400 includes a storage device 401 and a processor 402. For example, the storage device 401 may be a memory device. The storage device 401 is arranged to store a program code PROG including software modules such as the aforementioned context managing module 101, calculation module 102 and calibration module 103. When the program code PROG is loaded and executed by the processor 402, the processor 402 executes the steps shown in FIG. 3. Those skilled in the art can readily understand details of the operation of the electronic device 400 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A location context managing method applied to an electronic device having at least one sensor, comprising:
receiving positioning information from a plurality of positioning sources of different types;
receiving a value from the at least one sensor;
choosing a scenario from a scenario table based on the value received from the at least one sensor and the positioning information received from one or more of the plurality of positioning sources, wherein the scenario is a type of travel that the electronic device is undergoing; and
calculating a location of the electronic device according to the scenario, wherein the scenario table includes a plurality of scenarios, wherein the scenario includes positioning source information identifying which positioning information from the plurality of positioning sources is to be adopted or not adopted for the location calculation, and wherein the calculating of the location is based upon the positioning source information.

2. The context managing method of claim 1, wherein the at least one sensor comprises an accelerometer, a magnetic sensor, a gyroscope, a pressure sensor, or a microphone.

3. The context managing method of claim 2, wherein a status of the at least one sensor depends on variation of positioning data of the at least one sensor.

4. The context managing method of claim 2, wherein calculating the location of the electronic device according to the scenario comprises:
calculating a moving distance and a moving direction according to the value of the at least one sensor and a Dead-Reckoning method, wherein the location is calculated based at least partly on the moving distance and the moving direction.

5. The context managing method of claim 1, wherein the plurality of positioning sources comprises at least one radio signal processing circuit.

6. The context managing method of claim 5, wherein a positioning information of the at least one radio signal source depends on strength of a radio input received by the at least one radio signal processing circuit.

7. The context managing method of claim 5, wherein the plurality of positioning sources comprises at least two radio signal processing circuits, and the at least two radio signal processing circuit comprises at least two of a Global Navigation Satellite System (GNSS) receiver, a Wireless Fidelity (Wi-Fi) device, a Near-Field Communication (NFC) device, or a Bluetooth (BT) device.

8. The context managing method of claim 1, wherein the plurality of positioning sources comprises a map.

9. The context managing method of claim 8, wherein a positioning information of the map depends on at least an accuracy of the calculated location.

10. The context managing method of claim 1, further comprising:
calibrating at least one of the plurality of positioning sources according to the calculated location.

11. An electronic device having at least one sensor, comprising:
a storage device, arranged to store a program code; and
a processor, arranged to execute the program code, wherein when loaded and executed by the processor, the program code instructs the processor to execute the following steps:
receiving positioning information from a plurality of positioning sources;
receiving a value from the at least one sensor;
choosing a scenario from a scenario table based on the value received from the at least one sensor and the positioning information received from one or more of the plurality of positioning sources, wherein the scenario is a type of travel that the electronic device is undergoing; and
calculating a location of the electronic device according to the scenario, wherein the scenario table includes a plurality of scenarios, wherein the scenario includes positioning source information identifying which positioning information from the plurality of positioning sources is to be adopted or not adopted for the location calculation, and wherein the calculating of the location is based upon the positioning source information.

12. The electronic device of claim 11, wherein the at least one sensor comprises an accelerometer, a magnetic sensor, a gyroscope, a pressure sensor, or a microphone.

13. The electronic device of claim 12, wherein a positioning information of the at least one sensor depends on variation of positioning data of the at least one sensor.

14. The electronic device of claim 12, wherein calculating the location of the electronic device according to the scenario comprises:
calculating a moving distance and a moving direction according to the value of the at least one sensor and a Dead-Reckoning method, wherein the location is calculated based at least partly on the moving distance and the moving direction.

15. The electronic device of claim 11, wherein the plurality of positioning sources comprises at least one radio signal processing circuit.

16. The electronic device of claim 15, wherein a positioning information of the at least one radio signal source depends on strength of a radio input received by the at least one radio signal processing circuit.

17. The electronic device of claim 15, wherein the plurality of positioning sources comprises at least two radio signal processing circuits, and the at least two radio signal processing circuit comprises at least two of a Global Navigation Satellite System (GNSS) receiver, a Wireless Fidelity (Wi-Fi) device, a Near-Field Communication (NFC) device, or a Bluetooth (BT) device.

18. The electronic device of claim 11, wherein the plurality of positioning sources comprises a map.

19. The electronic device of claim 18, wherein a positioning information of the map depends on at least an accuracy of the calculated location.

20. The electronic device of claim 11, wherein when loaded and executed by the processor, the program code further instructs the processor to execute the following step:

calibrating at least one of the plurality of positioning sources according to the calculated location.

* * * * *